Feb. 27, 1934.  R. C. YANT  1,949,195
DISPENSING TRAILER
Filed Sept. 15, 1933   4 Sheets-Sheet 4
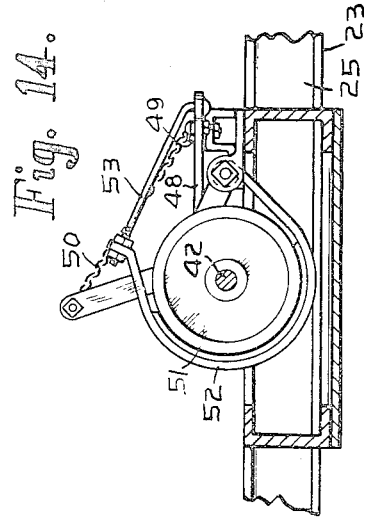
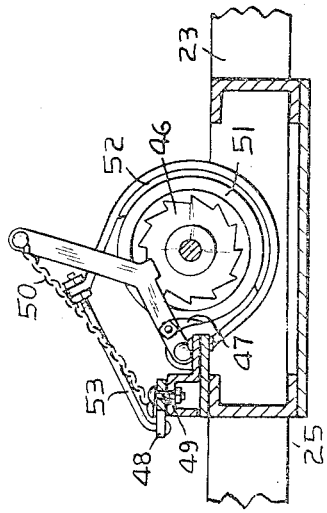
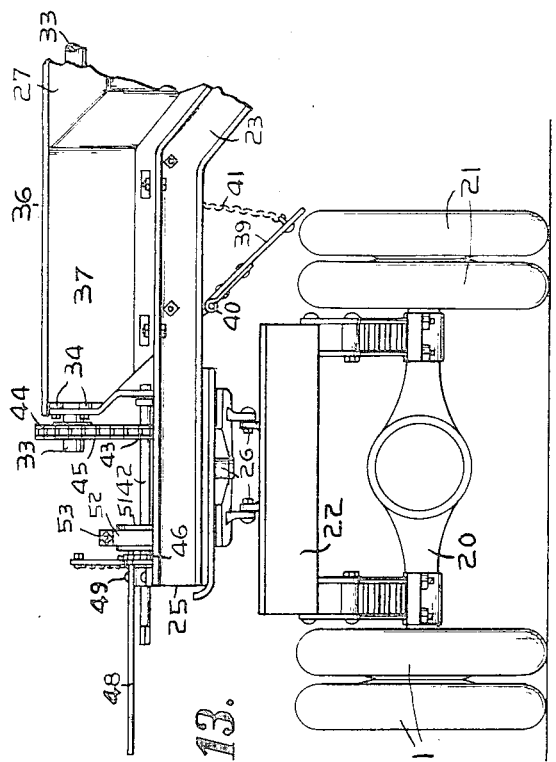
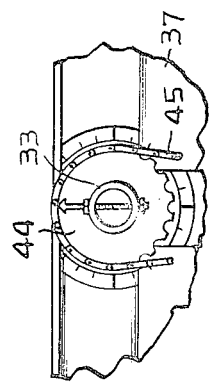
Inventor
R. C. Yant Patented Feb. 27, 1934

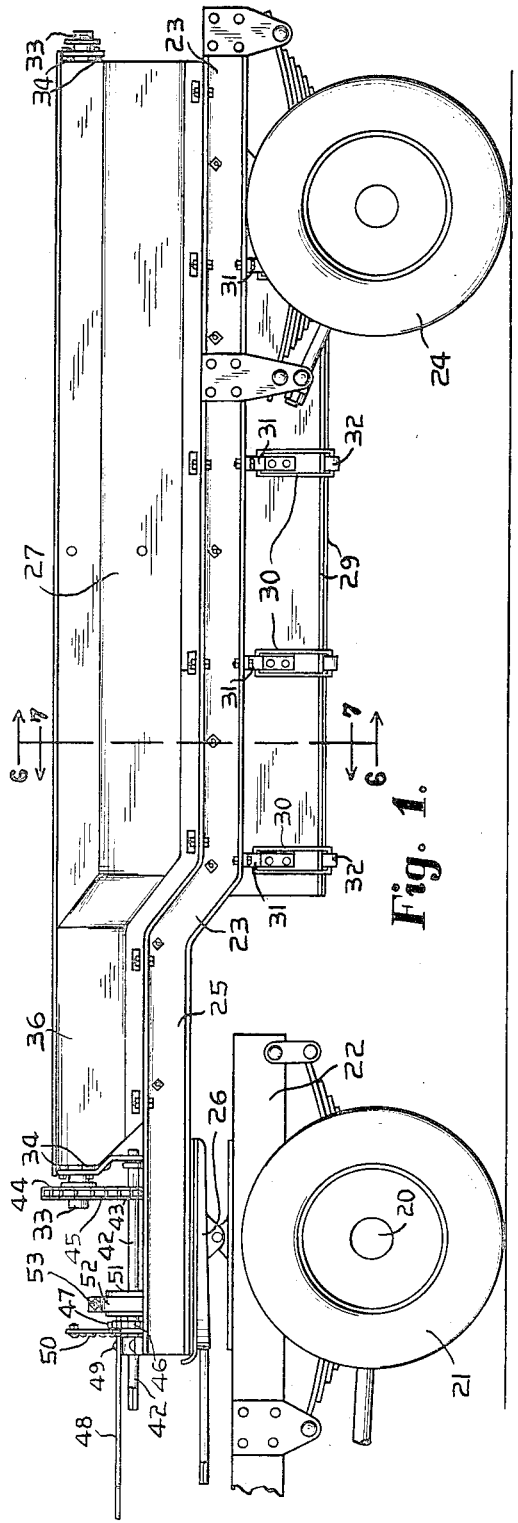
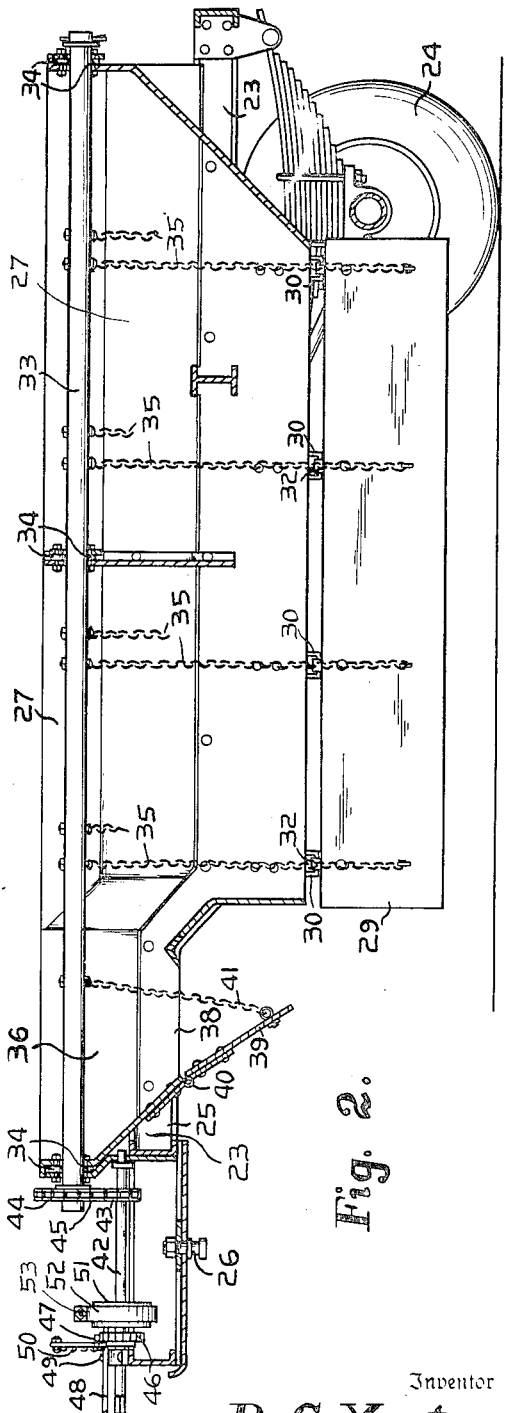

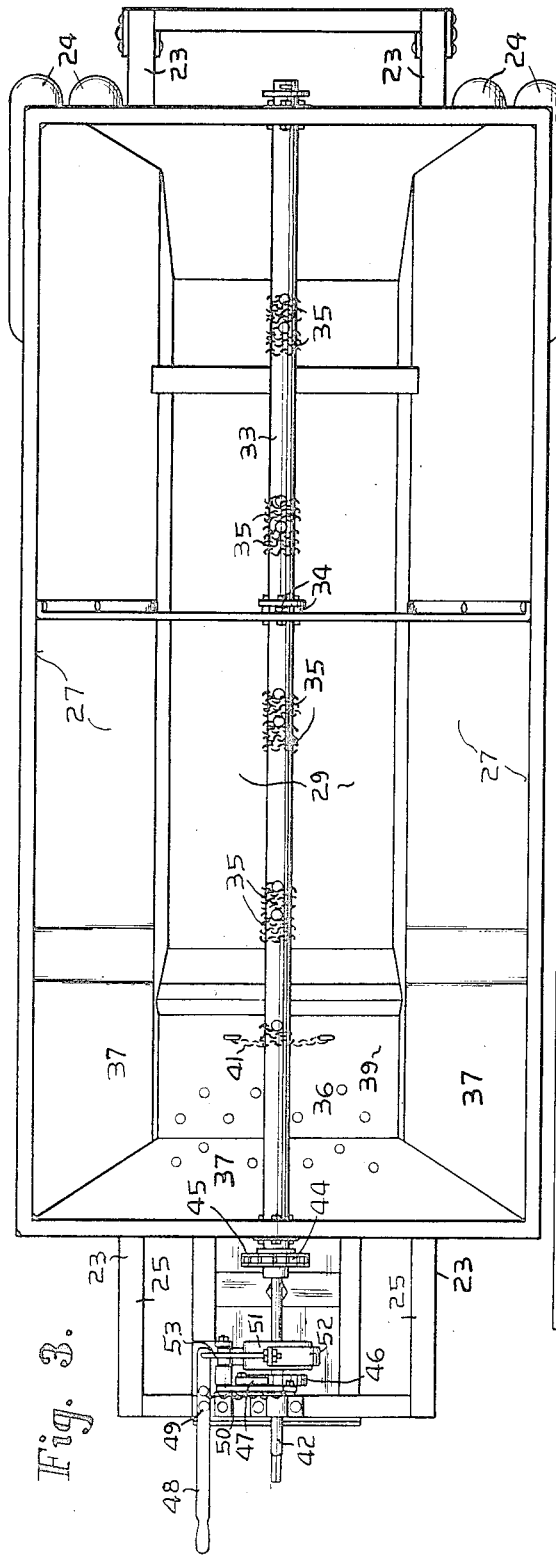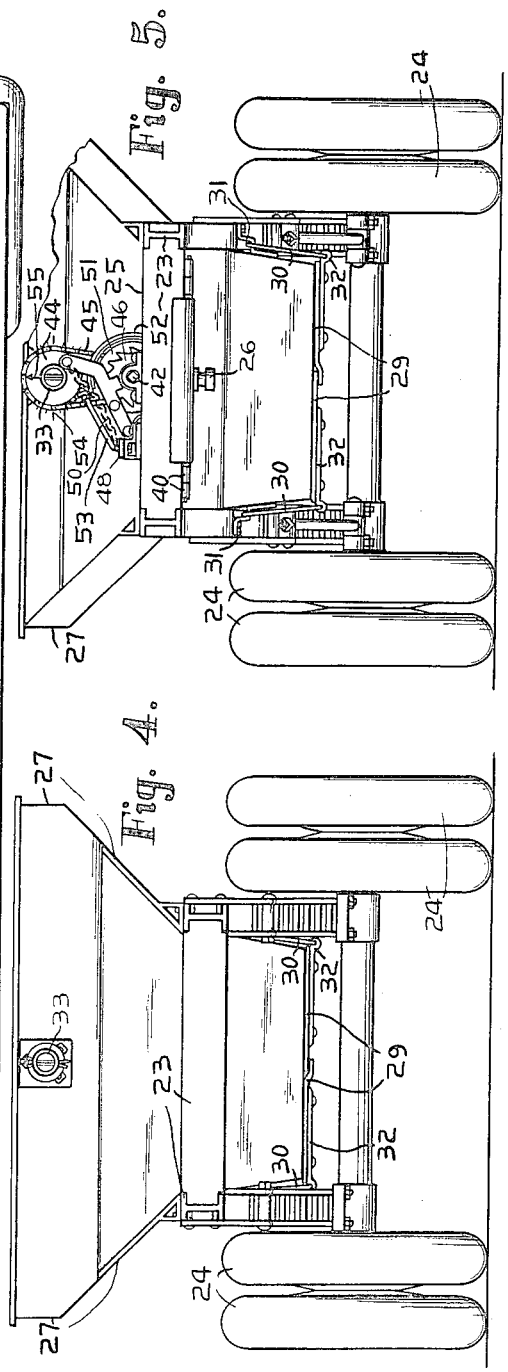

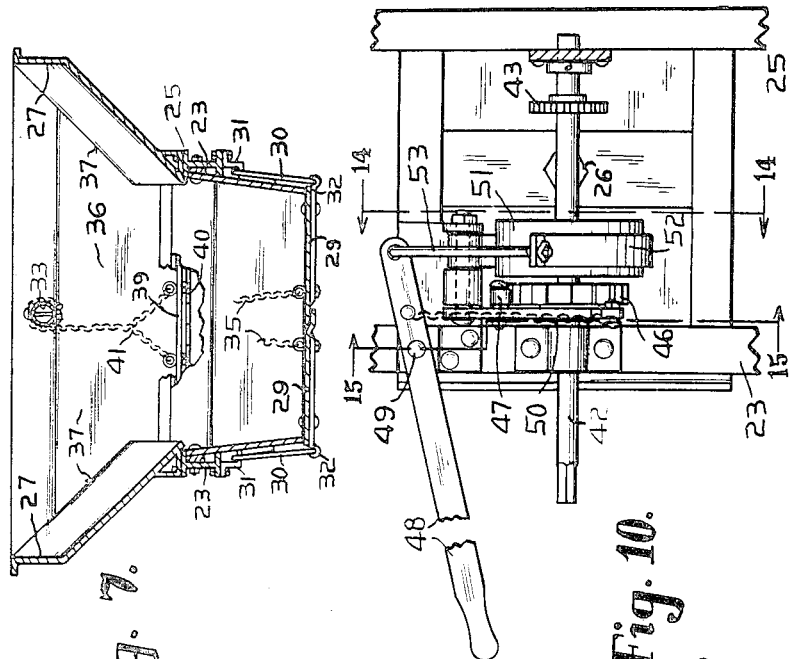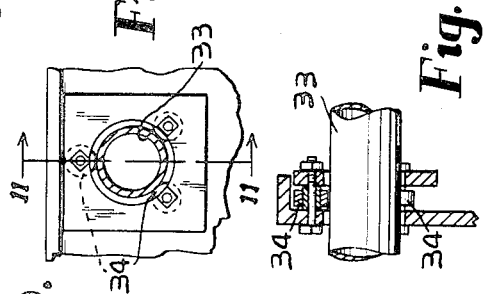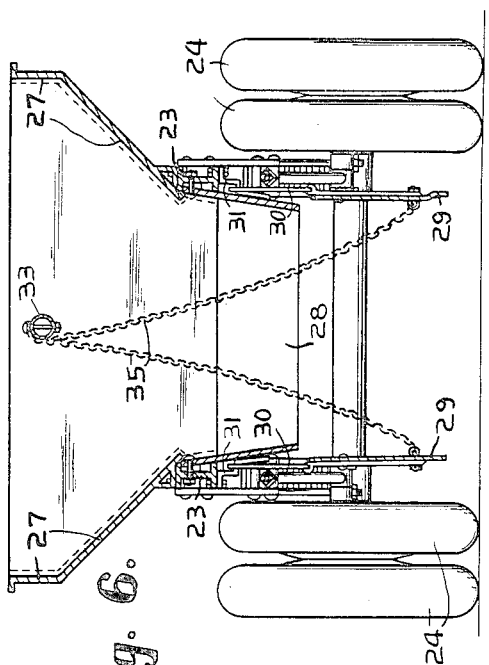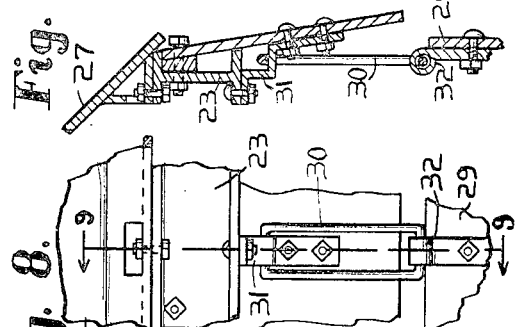

1,949,195

UNITED STATES PATENT OFFICE 1,949,195

DISPENSING TRAILER

Raymond C. Yant, Omaha, Nebr.

Application September 15, 1933
Serial No. 689,582

8 Claims. (Cl. 298—29)

This invention relates to an improvement in vehicle trailers and, especially to a trailer arranged for hauling and distributing or dispensing sand, gravel, crushed rock or similar road building material in connection with highway construction.

One object of the invention is to provide such a construction for the trailers that approximately 40 per cent of the weight of the load will be supported by the power-vehicle to which the trailer is attached.

Another object is to provide adjustable means under control of the driver for controlling the discharge of the load while the vehicle and trailer move forwardly, so that the distribution of material may be greater or less as may be required.

The invention includes a chassis or base frame for the trailer having an elevated front extension for a mounting on the vehicle, whereby the center of gravity of the load will be much lower than ordinary, and whereby the body of the trailer will not obtrude and will permit a free movement of a rear wheel of the vehicle beneath the front part of the trailer while driving upon sharp curves or when "turning about" after a load has been distributed. This elevated front end permits a part of the load of the trailer to be disposed on the top of the vehicle and operates to shift approximately 40 per cent of the weight of the load to the vehicle.

With the foregoing objects in view, and others which will appear, the invention presents a new and useful construction, combination and arrangement of parts as described herein and claimed, and as illustrated in the accompanying drawings, it being understood that changes may be made in form, size, proportions and minor details of construction, said changes being within the scope of the invention as claimed.

In the drawings, Fig. 1 is a side view showing the dispensing trailer mounted on a motor vehicle, the doors for the spillways being closed.

Fig. 2 is a side view of the trailer in longitudinal section, the doors being open.

Fig. 3 is a plan view of the dispensing trailer. Fig. 4 is a rear end view and Fig. 5 is a front end view of the trailer a part of the box being broken away.

Fig. 6 is a transverse section on line 6—6 of Fig. 1 looking toward the rear of the trailer.

Fig. 7 is a view of the box in transverse section looking toward its front end, showing a compartment therein, a part of the floor of the compartment being broken away to show a door.

Figs. 8 to 12 inclusive illustrate details. Fig. 8 illustrates a hingeable mounting for a door, the chassis, together with a side of the box and a door being broken away. Fig. 9 is a sectional view of parts on line 9—9 of Fig. 8.

Fig. 10 illustrates the use of friction rollers for the operating shaft journalled in an end of the box. Fig. 11 is a sectional view on line 11—11 of Fig. 10.

Fig. 12 is a plan view showing a hand lever and parts movable thereby for releasing the shaft and controlling the rotation of the shaft when distributing sand or gravel along a highway.

Fig. 13 is a detail showing the pivotal mounting of the trailer on a power vehicle and showing the positions of a door of the trailer and wheel of the vehicle when the latter is "turning about".

Fig. 14 is a section taken on line 14—14 of Fig. 12.

Fig. 15 is a sectional view on line 15—15 of Fig. 12, and Fig. 16 is a broken away view showing the use of a dial and index when controlling the discharge of material from the trailer.

Referring now to the drawings for a more particular description, the invention is shown and described in connection with a motor vehicle, the rear axle and wheels and chassis thereof being indicated respectively at 20, 21 and 22.

The dispensing trailer consists, in part, of a base frame or chassis 23 preferably of rectangular form, the rear wheels therefor being indicated at 24. The front end of the chassis has an elevated forwardly projecting extension 25 pivotally mounted, as indicated at 26, on the motor vehicle.

The box of the trailer has downwardly convergent sides 27. It is open at its top and its open bottom 28 (Fig. 6) provides a discharge passageway for the greater part of the contents of the box subject to the control of doors 29.

Each door 29 is carried by loops 30, the upper ends of the loops being pivotally mounted in staples 31 which are mounted on the chassis 25 at the outer side thereof, the lower ends of the loops being pivotally connected with the straps or hinge-members 32 which are secured to said doors.

Numeral 33 indicates a horizontal hollow shaft disposed longitudinally of the box, midway between the sides thereof, and preferably, friction rollers 34 are employed for the bearings of said shaft on the ends of the box.

Any suitable flexible members or chains 35 are secured to the shaft 33 and are attached to the doors 29, and it will be understood that a rotatable movement of the shaft will cause the doors to swing upwardly to closed position relative to the discharge passageway 28, and that a reverse rotary movement of the shaft will permit the doors to swing downwardly, by action of gravity, to open position.

Also adjustable means will be described for a control of the doors, so that they may be maintained with their edges near to each other or further apart, as may be desired, to control the discharge of sand or gravel while the load is moved and distributed on a highway.

One of the advantages in the elevated front extension 25 of the chassis is the fact that, on account of this feature, the center of gravity of the load will be disposed much lower than by any other construction. Another advantage is the fact that said extension will be disposed at a sufficient height to permit it to be mounted on the top of the chassis 22 of an ordinary automobile. A third advantage is that approximately 40 per cent of the weight of the load may be shifted to the automobile or other vehicle used for drawing the trailer, and the elevated extension 25 will permit the rear wheels 21 to move thereunder, and therefore will permit the power-vehicle to be driven upon sharp curves and to be "turned about" whenever required.

Another advantage in the use of the elevated extension 25 is the fact that it provides an area for a compartment 36 for containing additional material, said compartment being in communication with the main part of the box of the trailer and disposed above the top of the power-vehicle.

The compartment 36 has a bottom or floor consisting of inclined parts 37 as best shown in Fig. 3 of the drawings, and is provided with a discharge aperture 38.

Numeral 39 indicates a door for the aperture 38, said door being suitably hinged at 40 to the floor and flexibly connected with the shaft 33 by a strand or chain 41, and it will be understood that the door 39 will move coincidently with the doors 29 to open or closed position by movements of said shaft.

The shaft 33 is rotated in one direction for moving the door 39 and doors 29 to closed positions by rotating a stub-shaft 42, in suitable bearings, which is disposed below and parallel with said shaft 33, a crank (not shown) being applied to the end of said shaft 42 for this purpose.

The rear end of the shaft 42 is provided with a sprocket wheel 43. The front end of the shaft 33 is provided with a sprocket wheel 44, and a sprocket chain 45 engages these sprocket wheels, the ratchet wheel for said shaft 42 being indicated at 46 and the pawl for said ratchet wheel being indicated at 47.

The means for a control of the doors 29 and 39 during their downward swinging movement, best shown in Fig. 12, consist of a hand lever 48 mounted between its ends to swing horizontally from a pivot 49, said hand lever being provided with a flexible member or small chain 50 attached to the pawl 46.

Numeral 51 indicates a brake drum which is mounted on the stub shaft 42, the brake shoe mounted on said drum being indicated at 52. A pull-rod 53 connects the brake shoe with the end of the hand lever, and it will be seen that a movement of the hand lever 48 in one direction will cause simultaneous release of the pawl from the ratchet wheel and pressure of the brake band upon the brake drum.

The hand lever 48, projects toward the driver's seat of the vehicle, and said driver, according to the construction described, has a complete control for adjusting the discharge of material from the passageway 28 controlled by the doors 29 and the discharge aperture 38 of the compartment 36 controlled by the door 39.

If it is desired to deliver a limited supply of material to a highway, the driver, by use of the lever 48, permits a limited degree of rotation of the shaft 33 to move the doors in a limited arc. It is obvious that the doors may be moved coincidently, under control of said lever 48, to permit a greater quantity of material to be discharged when required. Numeral 54 indicates a dial which is secured to the front of the trailer and the shaft 33 is provided with an index 55, and the driver may regulate the movement or speed of the vehicle and may be guided by said dial, and therefore may have full control so that the distribution of road material during the travel of the trailer may be greater or less according to requirements.

It will be seen that all of the doors may be swung upwardly to closed positions simply by rotating the stub shaft as mentioned, the ratchet wheel and the brake drum on the stub shaft causing no resistance to this operation, and the pawl operating to maintain the doors in closed position.

While unloading, the vehicle and trailer are moved at moderate speed. It will be understood that the operator moves the lever horizontally which releases the pawl from the ratchet wheel and this movement of the lever also causes the brake to operate, and an operator may regulate the pressure of the brake-shoe to permit a lesser or greater discharge of material from the box.

I claim as my invention,—

1. In a dispensing trailer for a vehicle, a chassis having an elevated front extension for a mounting on a vehicle, an open box having downwardly converging sides, an apertured bottom-portion at its front end and a discharge passageway between its sides rearwardly of said apertured bottom-portion, a shaft in bearings disposed longitudinally of the box, hingeably mounted doors disposed longitudinally of the box for the discharge passageway thereof, a hingeably mounted door disposed transversely of the box for the apertured bottom-portion thereof, and flexible strands mounted on the shaft and attached to said doors, said box being disposed on the chassis with its apertured bottom-portion disposed in the vertical plane of the elevated extension thereof, said shaft being rotatable for moving said doors.

2. In a dispensing trailer for a vehicle, a chassis provided with an elevated forwardly projecting end-portion for a mounting on a vehicle, an open box having parallel sides and an apertured bottom-member at its front end and a discharge passageway between its sides rearwardly of said apertured bottom-member, a shaft disposed longitudinally of the box and journalled thereon, loops pivotally mounted on the sides of the box, doors disposed longitudinally of the box for closing said discharge passageway each door having hinge-members pivotally connected with said loops, a door disposed transversely of the box and hingeably mounted on the bottom-member of said box, flexible strands carried by the shaft and attached to said doors, said box being disposed on the chassis with its apertured bottom-member above and closely adjacent to the elevated extension thereof, said shaft being rotatable for moving said doors.

3. In a dispensing trailer for a vehicle, a chassis having an elevated front end-portion for a mounting on a vehicle, a box having approximately parallel sides, an apertured floor-member at its front end and a discharge passageway between its sides rearwardly of its apertured floor-member, a shaft in bearings disposed longitudinally of the box, pivotally mounted loops on the sides of the box, doors disposed longitudinally of the box and having hinge-members pivotally mounted on said loops, a door hingeably mounted on said apertured floor-member, flexible strands carried by the shaft and attached to said doors, said box being mounted on the chassis with its apertured floor-member disposed above and adjacent to the elevated front end-portion of said chassis, and devices for rotating the shaft to cause the doors to swing upwardly to closed position, said shaft being movable to permit said doors to move to open position.

4. In a dispensing trailer for an axle-bearing vehicle, a chassis having an upwardly struck front end-portion disposed in a plane above other parts of the chassis for a pivotal mounting on said vehicle, a box mounted on the chassis having downwardly convergent sides and an apertured floor-portion at its front end above the upwardly struck end-portion of the chassis and having a discharge passageway rearwardly of said apertured floor-portion, hingeably mounted doors disposed longitudinally of the chassis for said discharge passageway, a hingeably mounted door disposed transversely of the chassis for the aperture of said floor-portion, a rotatable shaft mounted on said box, flexible strands carried by the shaft and attached to said shaft for moving said doors.

5. In a dispensing trailer for a vehicle, a box having downwardly convergent sides, an apertured bottom-portion at its front end and a discharge passageway between its sides rearwardly of its apertured bottom-portion, hingeably mounted doors for said discharge passageway, a hingeably mounted door for the aperture of said bottom-portion, a rotatable shaft mounted on the box and flexibly connected with said doors, a chassis formed with an elevated extension at its front end and disposed beneath with a part of its elevated extension projecting forwardly of the box for a pivotal mounting on said vehicle, and devices connected with the shaft and disposed on the elevated extension of the chassis forwardly of the box for controlling the rotation of the shaft.

6. In a dispensing trailer for a vehicle, a chassis having an elevated extension at its front end pivotally mounted on a vehicle, an opex box mounted on the chassis and having a discharge passageway in its bottom, hingeably mounted doors for said discharge passageway, an operating shaft flexibly connected with said doors and mounted on said box, a stub-shaft mounted on said chassis having a geared connection with the operating shaft and adapted to be rotated for moving the doors to closed position in said discharge passageway, a ratchet wheel on the stub shaft, a pawl normally engaging the ratchet wheel, a brake drum on the stub shaft, a brake-shoe for the brake drum, and a pivotally mounted hand-lever connected with and adapted to be moved for disengaging the pawl from the ratchet wheel and moving the brake-shoe into engagement with said brake drum to coincidently permit and control movements of the doors to open positions relative to said passageway.

7. A dispensing trailer including a chassis, a box having discharge passageways in its bottom and mounted on the chassis, hingeably mounted doors for said passageways, an operating shaft extending through and journalled in the ends of the box and flexibly connected with said doors, a stub shaft having a geared connection with the operating shaft and adapted to be rotated to actuate the operating shaft for moving said doors to closed relation with said discharge passageways, a ratchet wheel on the stub shaft, a pawl normally engaging the ratchet wheel, a brake drum on the stub shaft, a brake-shoe for said brake drum, and a hand-lever connected with the pawl and brake-shoe and adapted to be moved for coincidently disengaging the pawl from the ratchet wheel and pressing the brake band against the brake drum to permit and control the movements of said operating shaft and said doors.

8. A dispensing trailer including a chassis, a box carried by the chassis having discharge passageways in its bottom, hingeably mounted doors for said passageways, an operating shaft on the box flexibly connected with said doors, a stub shaft in bearings, a ratchet wheel and brake drum each mounted on the stub shaft, a pawl normally engaging the ratchet wheel, a brake-shoe for the brake drum, co-operating connecting-devices whereby a rotatable movement of the stub shaft or the operating shaft will cause uniform rotation of both of said shafts, said stub shaft being rotatable for moving the doors to closed positions, and a lever connected with said pawl and said brake-shoe adapted to be moved to permit a movement of said doors to open position, the pawl thereby being disengaged from the ratchet wheel and the brake-shoe thereby being pressed against the brake-shoe.

RAYMOND C. YANT.